(12) United States Patent  
Fox et al.

(10) Patent No.: US 9,074,671 B2
(45) Date of Patent: Jul. 7, 2015

(54) LIMITED SLIP DIFFERENTIAL

(71) Applicant: Eaton Corporation, Cleveland, OH (US)

(72) Inventors: Matthew G. Fox, Ceresco, MI (US); Gregory L. Heatwole, Marshall, MI (US); Andrew N. Edler, Homer, MI (US); Scott M. Besemer, Battle Creek, MI (US); Christian Chimner, Royal Oak, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/049,423

(22) Filed: Oct. 9, 2013

(65) Prior Publication Data

US 2014/0179485 A1 Jun. 26, 2014

Related U.S. Application Data

(60) Provisional application No. 61/712,239, filed on Oct. 10, 2012, provisional application No. 61/831,425, filed on Jun. 5, 2013, provisional application No. 61/887,479, filed on Oct. 7, 2013.

(51) Int. Cl.
*F16H 48/20* (2012.01)
*F16H 48/22* (2006.01)
*F16D 25/06* (2006.01)
*B60W 10/04* (2006.01)
*F16H 48/32* (2012.01)

(52) U.S. Cl.
CPC .............. *F16H 48/22* (2013.01); *F16D 25/06* (2013.01); *B60K 41/227* (2013.01); *F16H 48/32* (2013.01); *F16H 2048/204* (2013.01)

(58) Field of Classification Search
CPC ........ B60K 41/227; F16H 48/22; F16H 48/32
USPC .................... 477/79; 475/200, 203, 221, 231, 475/237–239
See application file for complete search history.

(56) References Cited

U.S. PATENT DOCUMENTS

| | | | |
|---|---|---|---|
| 4,966,250 A * | 10/1990 | Imaseki | 180/233 |
| 5,456,641 A * | 10/1995 | Sawase | 475/86 |
| 6,183,387 B1 | 2/2001 | Yoshioka | |
| 6,283,885 B1 | 9/2001 | Irwin | |
| 6,692,396 B1 | 2/2004 | Grogg et al. | |
| 6,802,791 B1 | 10/2004 | Yoshioka | |
| 7,007,782 B2 | 3/2006 | Anwar et al. | |
| 7,051,857 B2 | 5/2006 | Babin | |
| 7,059,460 B2 | 6/2006 | Duan et al. | |
| 7,210,566 B2 | 5/2007 | Baxter, Jr | |

(Continued)

*Primary Examiner* — Roger Pang
(74) *Attorney, Agent, or Firm* — Remarck Law Group PLC

(57) ABSTRACT

A limited slip differential assembly includes a planetary gear assembly, a differential case, a differential gear assembly and a hydraulic clutch assembly. The differential case is coupled for rotation with a portion of the planetary gear assembly. The differential gear assembly is arranged within the differential case and includes a first side gear and a second side gear for coupling with first and second drive wheels of a vehicle, respectively. The hydraulic clutch assembly includes a clutch pack and a clutch actuator. Pressurized hydraulic fluid from a transmission pump is selectively provided to the clutch pack to actuate the clutch pack between an open configuration, in which the side gears rotate independently, and a fully closed configuration, in which the side gears rotate together such that the first and second drive wheels rotate at a same speed.

20 Claims, 2 Drawing Sheets

(56) References Cited

U.S. PATENT DOCUMENTS

| | | |
|---|---|---|
| 7,258,136 B2 | 8/2007 | Haarer et al. |
| 7,281,617 B2 | 10/2007 | Puiu |
| 7,318,511 B2 | 1/2008 | Grogg |
| 7,353,928 B2 | 4/2008 | Yoshioka |
| 7,357,236 B2 | 4/2008 | Yoshioka |
| 7,980,983 B2 * | 7/2011 | Schrand et al. ............... 475/231 |
| 8,579,752 B2 | 11/2013 | Fox et al. |
| 8,602,151 B2 * | 12/2013 | Linortner ..................... 180/249 |
| 8,827,859 B2 * | 9/2014 | Fox ............................... 475/231 |
| 2003/0004027 A1 * | 1/2003 | Gassmann .................... 475/221 |
| 2004/0163856 A1 * | 8/2004 | Kroppe .......................... 180/6.2 |
| 2008/0227582 A1 * | 9/2008 | Peura ............................ 475/221 |
| 2009/0215582 A1 * | 8/2009 | Carey et al. .................. 475/277 |
| 2014/0141921 A1 * | 5/2014 | Fox et al. ..................... 475/231 |
| 2014/0179484 A1 * | 6/2014 | Fox et al. ..................... 475/231 |

\* cited by examiner

US 9,074,671 B2

LIMITED SLIP DIFFERENTIAL

CROSS-REFERENCE TO RELATED APPLICATIONS

This application claims the benefit of U.S. Provisional Application No. 61/712,239 which was filed on Oct. 10, 2012, U.S. Provisional Application No. 61/831,425 which was filed on Jun. 5, 2013, and U.S. Provisional Application No. 61/887,479 which was filed on Oct. 7, 2013. The disclosures of each of the above applications are incorporated herein by reference in their entirety.

FIELD

The present disclosure relates generally to a limited slip differential and, more particularly, to an electronic limited slip differential with an integral hydraulic supply.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning to the drive wheel that is not spinning.

Electronically-controlled, limited-slip differentials can include a hydraulically-actuated clutch to limit differential rotation between output shafts of the differential. The hydraulically-actuated clutch, however, must be powered by a separate pump, e.g., connected to a vehicle drive shaft. In addition to the extra cost associated with providing a separate pump as described, such pumps can introduce parasitic energy losses that can negatively impact vehicle fuel economy and vehicle operation. For at least these reasons, an improved differential is desired.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

The present disclosure will become more fully understood from the detailed description and the accompanying drawings, wherein.

Figure 1:
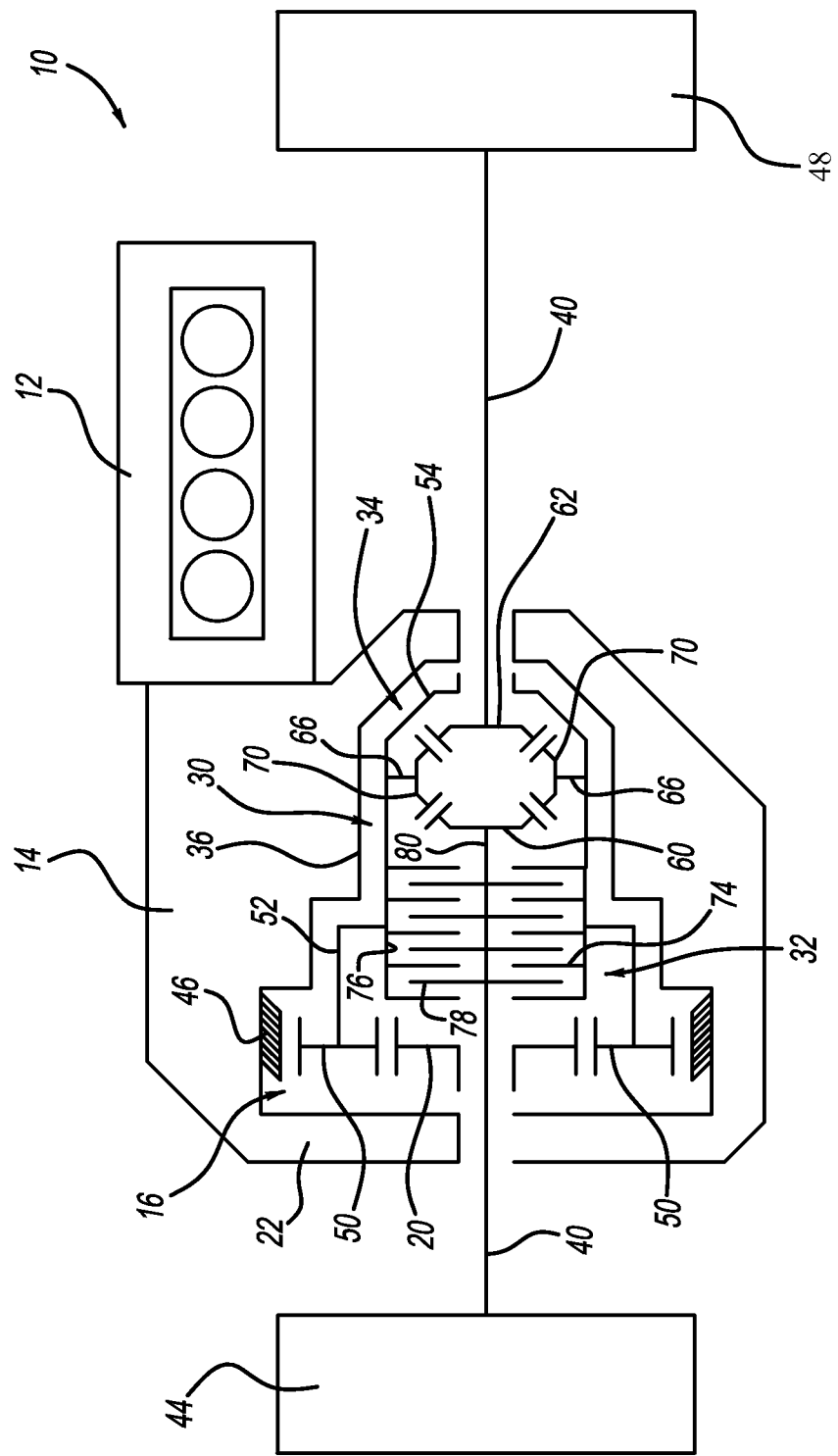
FIG. 1 is a schematic diagram on an example limited slip differential according to various embodiments of the present disclosure.

Additional drawings and materials are attached as an Appendix at the end of the present disclosure.

SUMMARY

According to some embodiments of the present disclosure, a limited slip differential assembly for a vehicle includes a planetary gear assembly. The planetary gear assembly includes a sun gear, a plurality of planet gears and a ring gear. The sun gear is rotatably coupled to a transmission and configured to transmit rotational force to the plurality of planet gears. The limited slip differential assembly further includes a differential case coupled for rotation with the plurality of planet gears, and a differential gear assembly arranged within the differential case. The differential gear assembly includes a first side gear and a second side gear coupled to first and second drive wheels of the vehicle, respectively.

A hydraulic clutch assembly coupling the planetary gear assembly with the differential gear assembly is also included in the limited slip differential assembly. The hydraulic clutch assembly includes a clutch pack and a clutch actuator. The clutch actuator is in fluid communication with a transmission pump of the vehicle such that pressurized hydraulic fluid from the transmission pump is provided to the clutch pack to selectively actuate the clutch pack between an open configuration and a fully closed configuration.

The clutch pack includes a plurality of annular plates interleaved with a plurality of annular friction disks. The plurality of annular plates is coupled for rotation with one of the differential case and the differential gear assembly and the plurality of annular friction disks is coupled for rotation with the other one of the differential case and the differential gear assembly. The open configuration corresponds to the plurality of annular plates and the plurality of annular friction disks being configured to rotate independently in a substantially non-contacting relationship. The fully closed configuration corresponds to the plurality of annular plates and the plurality of annular friction disks being configured to rotate together in a contacting relationship. The first and second side gears rotate independently in the open configuration such that the first and second drive wheels can rotate at different speeds. Further, the first and second side gears rotate together in the fully closed configuration such that the first and second drive wheels rotate at a same speed.

In other aspects of the present disclosure, a vehicle driveline is disclosed. The vehicle driveline includes an engine, a transmission, and a limited slip differential assembly. The transmission is coupled to and receives a rotary output from the engine and includes a transmission pump. The limited slip differential assembly is coupled to the transmission and configured to provide a drive force to first and second drive wheels of a vehicle.

The limited slip differential assembly includes a planetary gear assembly, a differential case, a differential gear assembly and a hydraulic clutch assembly. The planetary gear assembly is coupled to and receives rotational force from the transmission. The differential case is coupled for rotation with a portion of the planetary gear assembly. The differential gear assembly is arranged within the differential case and includes a first side gear and a second side gear for coupling with the first and second drive wheels of the vehicle, respectively.

The hydraulic clutch assembly couples the planetary gear assembly with the differential gear assembly. Further, the hydraulic clutch assembly includes a clutch pack and a clutch actuator. The clutch actuator is in fluid communication with the transmission pump such that the pressurized hydraulic fluid from the transmission pump is selectively provided to the clutch pack to actuate the clutch pack between an open configuration and a fully closed configuration. The first and second side gears rotate independently in the open configuration such that the first and second drive wheels can rotate at different speeds. Additionally, the first and second side gears rotate together in the fully closed configuration such that the first and second drive wheels rotate at a same speed.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

With initial reference to FIG. 1, an exemplary vehicle driveline is shown and generally identified with reference numeral 10. The exemplary vehicle driveline 10 described herein is for a front wheel drive vehicle having a transversely mounted engine 12, although other configurations can be utilized with the present disclosure. The engine 12 provides a rotary output to a transmission 14.

The driveline 10 can further include a transaxle 22 and a limited slip differential assembly 30 having a planetary gear assembly 16, a clutch assembly 32 and a differential gear assembly 34. The limited slip differential assembly 30 is received in a housing 36 and operates to drive a pair of axle shafts 40 and 42 that are connected to front drive wheels 44 and 48, respectively. In general, the limited slip differential assembly 30 functions as a traditional open differential during normal operating conditions until an event occurs where a bias torque is required. When a loss in traction is detected or anticipated, the clutch assembly 32 can be selectively actuated in order to generate the optimum bias ratio for the situation.

The transmission 14 can receive the rotary output from the engine 12 and provide a rotary input to the limited slip differential assembly 30. Further, the transmission 14 can be operable to provide various gear ratios between the rotary output of the engine 12 and the rotary input of the limited slip differential assembly 30.

The planetary gear assembly 16 includes a ring gear 46, a sun gear 20 and a plurality of planet gears 50 carried by a planet carrier 52. The ring gear 46 is non-rotatably fixed to the housing 36, and the sun gear 20 is meshingly engaged with the plurality of planet gears 50 carried by the planet carrier 52. The planet gears 50 are meshed with the ring gear 46. The planet carrier 52 is coupled for rotation with a differential case 54 of the differential gear assembly 34. The planetary gear assembly 16 provides a gear ratio reduction from the sun gear 20 to the planetary carrier 52 and, therefore, to the differential case 54. The sun gear 20 is rotatably coupled to the transmission 14 via a coupling device, such as a chain or belt, such that an output of the transmission 14 drivingly rotates the sun gear 20, which translates rotational output from the transmission 14 into rotational input of the sun gear 20.

The differential gear assembly 34 includes a pair of side gears 60 and 62 that are mounted for rotation with the axle shafts 40 and 42 (and first and second drive wheels 44 and 48), respectively. A plurality of cross pins or pinion gear shafts 66 are fixedly mounted to the differential case 54 for rotation therewith. A corresponding plurality of pinion gears 70 are mounted for rotation with the pinion gear shafts 66 and are in meshing relationship with both of the side gears 60 and 62. In an open configuration, described more fully below, the differential gear assembly 34 acts to allow the axle shafts 40 and 42 to rotate at different speeds.

The clutch assembly 32 couples the planetary gear assembly 16 with the differential gear assembly 34. The clutch assembly 32 includes a clutch pack and a clutch actuator. The clutch pack includes a plurality of annular plates 74 interleaved between a plurality of annular friction disks 78. The plurality of annular plates 74 can be coupled for rotation with one of the differential case 54 and the differential gear assembly 34. The plurality of annular friction disks 78 can be coupled for rotation with the other one of the differential case 54 and the differential gear assembly 34. In the illustrated embodiment, the plurality of annular plates 74 are coupled for rotation to the differential case 54 (e.g., splined to an inner diameter 76 of the differential case 54) and the plurality of annular friction disks 78 are coupled for rotation with the differential gear assembly 34 (e.g., splined to an outer diameter 80 of the side gear 60). It will be appreciated that the annular friction disks 78 may be supported for rotation by either of the side gears 60 or 62, or both.

The plurality of annular plates 74 and annular friction disks 78 are interleaved between one another and act to rotate past one another in substantially non-contacting relationship when the clutch assembly 32 is in its open position. However, it will be appreciated by those skilled in the art that the term "non-contacting" as used herein is relative and is not meant to necessarily indicate that the annular plates 74 and annular friction disks 78 have absolutely no contact when the clutch assembly 32 is in the open condition. The annular plates 74 and annular friction disks 78 are axially movable into frictional engagement relative to one another, thereby reducing relative rotation between the annular plates 74 and annular friction disks 78 when the clutch assembly 32 is in the closed or partially closed configurations. In this manner, when the clutch assembly 32 is in its closed position, the side gears 60 and 62, as well as the axle shafts 40 and 42 and the drive wheels 44 and 48 rotate together.

The clutch assembly 32 can operate in an open configuration to allow the side gears 60 and 62 to rotate independently from each other, e.g., at different speeds. The clutch assembly 32 can also operate in a closed or partially closed configuration where the side gears 60 and 62 rotate together or partially together (that is, not independently), e.g., at substantially the same speed. The clutch assembly 32 can, for example, be a hydraulic clutch assembly 32 that utilizes pressurized hydraulic fluid to selectively actuate the clutch pack between the open, closed and partially closed configurations.

The clutch actuator can include a piston that interacts with the clutch pack (annular plates 74 and annular friction disks 78) to selectively actuate the clutch pack between the open, fully closed and partially closed configurations. In a hydraulic clutch assembly 32, the piston is in fluid communication with a source of pressurized hydraulic fluid, e.g., via a hydraulic fluid valve that provides the pressurized hydraulic fluid from a hydraulic fluid source. Adjusting the pressure of the provided pressurized hydraulic fluid will result in movement of the piston to selectively actuate the clutch pack. In some embodiments of the present disclosure, the clutch actuator also includes the hydraulic fluid valve, as further described below.

Figure 2:
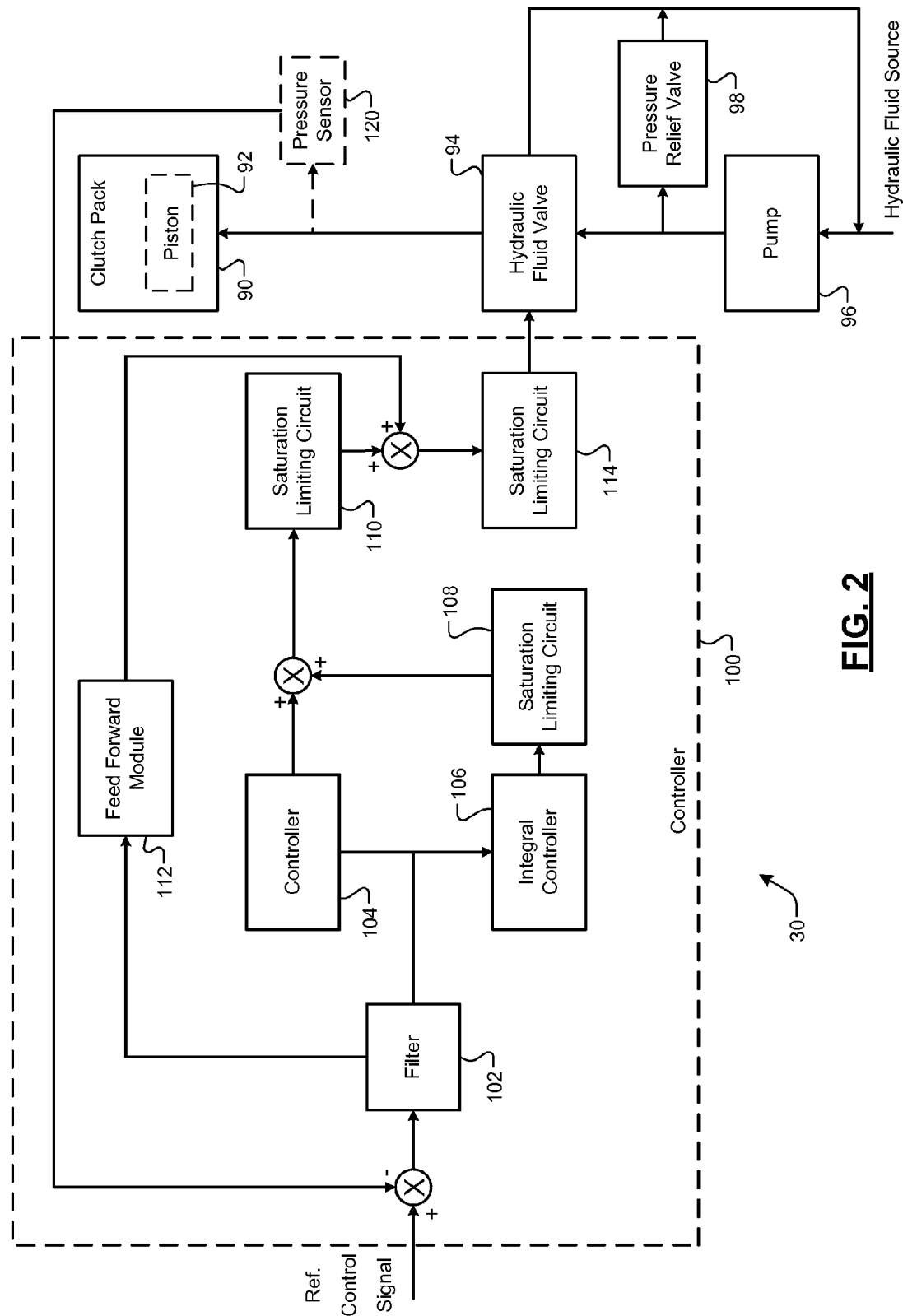
FIG. 2 is a functional block diagram of the example limited slip differential of FIG. 1 coupled to a source of hydraulic fluid.

With further reference to FIG. 2, an example configuration for the limited slip differential assembly 30 is shown. As described above, the limited slip differential assembly 30 includes a clutch pack 90 (e.g., including the plurality of annular plates 74 interleaved between the plurality of annular friction disks 78). The clutch pack 90 is in communication with a clutch actuator, such as a piston 92, in fluid communication with a hydraulic fluid valve 94. The hydraulic fluid valve 94 can be a spool valve, such as three-way spool valve. In some embodiments, the clutch actuator further includes the hydraulic fluid valve 94. The clutch actuator is configured to selectively actuate the clutch pack 90 between an open, fully closed and partially closed configuration.

The clutch actuator (such as piston 92 and hydraulic fluid valve 94) is in fluid communication with a source of pressurized hydraulic fluid. The source of pressurized hydraulic fluid can be a pump 96 that receives and pressurizes hydraulic fluid from a hydraulic fluid source. In the present embodiment, the pump 96 is a transmission pump of the vehicle that received hydraulic fluid from a hydraulic fluid source, such as a transmission sump. A pressure relief valve 98 can be included between the hydraulic fluid valve 94 and pump 96 in order to provide pressure relief. Further, the hydraulic fluid valve 94 and pressure relief valve 98 can return surplus pressurized hydraulic fluid to the hydraulic fluid source when desirable.

The hydraulic fluid valve 94 receives a control signal from a controller 100. The controller 100 can be a proportional-integral-derivative controller, an example of which is illustrated in FIG. 2. The controller 100 receives a reference control signal, e.g., from a control system of the vehicle. Example vehicle control systems include, but are not limited to, an engine control unit, a stability control system, a traction control system and combinations thereof. The reference control signal can provide an indication of a commanded pressure to provide to the clutch pack 90. Further, the controller 100 can receive a pressure signal from a pressure sensor 120 indicative of the sensed pressure of the pressurized hydraulic fluid being provided to the clutch pack 90.

In various embodiments, a difference between the reference control signal and pressure signal is determined and provided to a filter 102. The filter 102 can be a deadband filter, although other types of filters can be used. The filter 102 outputs a filtered difference signal to both a proportional-derivative controller 104 and an integral controller 106, as well as a feed forward circuit 112. The output of the integral controller 106 is provided to a saturation limiting circuit 108, which ensures that the output signal does not exceed the saturation limit of the hydraulic fluid valve 94.

The outputs of the proportional-derivative controller 104 and the integral controller 106 are summed and provided to another saturation limiting circuit 110, which ensures that the summed signal does not exceed the saturation limit of the hydraulic fluid valve 94. The output of the saturation limiting circuit 110 can be summed with the output of the feed forward circuit 112, and the summed provided to another saturation limiting circuit 114. Saturation limiting circuit 114 ensures that the summed does not exceed the saturation limit of the hydraulic fluid valve 94. The output of the saturation limiting circuit 114 is the control signal provided to the hydraulic fluid valve 94, which is controlled in accordance with this control signal to adjust the pressure of the pressurized hydraulic fluid to the clutch pack 90.

The limited slip differential 30 is operated as follows. When in an operating condition in which an open differential is commanded, e.g., by the vehicle control system, the clutch pack 90 is maintained in the open configuration. The open configuration corresponds to the plurality of annular plates 74 and the plurality of annular friction disks 78 being configured to rotate independently in a substantially non-contacting relationship, as described above. Further, the first and second side gears 60 and 62 rotate independently in the open configuration. It should be appreciated that the term "independently" when describing the rotation of the first and second side gears 60 and 62 is not meant to mean completely independently as the first and second side gears 60 and 62 are both coupled to and rotate with the differential case 54. The description of the first and second side gears 60 and 62 as rotating "independently" is meant to describe relative rotation of the first and second side gears 60 and 62 such that the first and second drive wheels 44 and 48 can rotate at different speeds.

When in an operating condition in which a fully closed differential is commanded, e.g., by the vehicle control system, the clutch pack 90 is actuated to be in the closed configuration. The fully closed configuration corresponds to the plurality of annular plates 74 and the plurality of annular friction disks 78 being configured to rotate together in a contacting relationship. Further, the first and second side gears 60 and 62 rotate together in the fully closed configuration. It should be appreciated that the term "rotate together" when describing the rotation of the first and second side gears 60 and 62 is meant to describe relative rotation of the first and second side gears 60 and 62 such that the first and second drive wheels rotate at a same speed.

Further, the limited slip differential assembly 30 can be operated in one or more intermediate, partially closed configurations between the open and fully closed configurations. When in an operating condition in which an intermediate, partially closed differential is commanded, e.g., by the vehicle control system, the clutch pack 90 is actuated to be in an intermediate partially closed configuration. The intermediate partially closed configuration corresponds to the plurality of annular plates 74 and the plurality of annular friction disks 78 being in a contacting relationship in order to reduce relative rotation between the plurality of annular plates 74 and the plurality of annular friction disks 78 such that the first and second side gears 60 and 62 do not rotate "independently" as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A limited slip differential assembly for a vehicle, comprising:
   a planetary gear assembly including a sun gear, a plurality of planet gears and a ring gear, the sun gear being rotatably coupled to an automatic transmission and configured to transmit rotational force to the plurality of planet gears;
   a differential case coupled for rotation with the plurality of planet gears;
   a differential gear assembly arranged within the differential case and including a first side gear and a second side gear coupled to first and second drive wheels of the vehicle, respectively; and
   a hydraulic clutch assembly coupling the planetary gear assembly with the differential gear assembly, the hydraulic clutch assembly including a clutch pack and a clutch actuator, the clutch actuator being in fluid communication with an automatic transmission pump of the vehicle such that pressurized hydraulic fluid from the transmission pump is provided to the clutch pack to selectively actuate the clutch pack between an open configuration and a fully closed configuration,
   wherein the clutch pack includes a plurality of annular plates interleaved with a plurality of annular friction disks, the plurality of annular plates being coupled for rotation with one of the differential case and the differential gear assembly and the plurality of annular friction disks being coupled for rotation with the other one of the differential case and the differential gear assembly, wherein (i) the open configuration corresponds to the plurality of annular plates and the plurality of annular friction disks being configured to rotate independently in a substantially non-contacting relationship, and (ii) the fully closed configuration corresponds to the plurality of annular plates and the plurality of annular friction disks being configured to rotate together in a contacting relationship, and wherein the first and second side gears: (i) rotate independently in the open configuration such that the first and second drive wheels can rotate at different speeds, and (ii) rotate together in the fully closed configuration such that the first and second drive wheels rotate at a same speed.

2. The limited slip differential assembly of claim 1, wherein the clutch actuator includes a piston that interacts with the clutch pack to selectively actuate the clutch pack between the open and fully closed configuration, the piston being in fluid communication with a hydraulic fluid valve that provides pressurized hydraulic fluid from the transmission pump to the clutch pack.

3. The limited slip differential assembly of claim 2, wherein the clutch actuator further includes the hydraulic fluid valve.

4. The limited slip differential assembly of claim 3, wherein the hydraulic fluid valve is a spool valve.

5. The limited slip differential assembly of claim 2, further comprising:
a pressure sensor for sensing a pressure of the pressurized hydraulic fluid provided to the clutch pack; and
a controller in communication with the pressure sensor and configured to provide a control signal to the hydraulic fluid valve to adjust the pressure.

6. The limited slip differential assembly of claim 5, wherein the controller is a proportional-integral-derivative controller.

7. The limited slip differential assembly of claim 1, wherein the clutch actuator is configured to selectively actuate the clutch pack between the open configuration, the fully closed configuration and at least one intermediate partially closed configuration, wherein the at least one intermediate partially closed configuration corresponds to the plurality of annular plates and the plurality of annular friction disks being in a contacting relationship in order to reduce relative rotation between the plurality of annular plates and the plurality of annular friction disks such that the first and second side gears do not rotate completely independently.

8. The limited slip differential assembly of claim 1, wherein the first and second drive wheels of the vehicle are front wheels.

9. The limited slip differential assembly of claim 6 wherein the controller further comprises a proportional-derivative controller, an integral controller and a feed forward circuit, wherein an output of the integral controller is provided to a first saturation limiting circuit, wherein respective outputs of the proportional-derivative controller and the integral controller are summed at a second saturation limiting circuit, wherein an output of the second saturation limiting circuit is summed with an output of the feed forward circuit and provided to a third saturation limiting circuit, an output of the third saturation limiting circuit controlling the hydraulic fluid valve.

10. The limited slip differential assembly of claim 9 wherein each of the first, second and third saturation limiting circuits ensure that a respective output signal does not exceed a saturation limit of the hydraulic fluid valve.

11. A vehicle driveline, comprising:
an engine;
an automatic transmission coupled to and receiving a rotary output from the engine, the transmission including an automatic transmission pump; and
a limited slip differential assembly coupled to the transmission and configured to provide a drive force to first and second drive wheels of a vehicle, the limited slip differential assembly comprising:
a planetary gear assembly coupled to and receiving rotational force from the transmission,
a differential case coupled for rotation with a portion of the planetary gear assembly,
a differential gear assembly arranged within the differential case and including a first side gear and a second side gear for coupling with the first and second drive wheels of the vehicle, respectively, and
a hydraulic clutch assembly coupling the planetary gear assembly with the differential gear assembly, the hydraulic clutch assembly including a clutch pack and a clutch actuator, the clutch actuator being in fluid communication with the transmission pump such that the pressurized hydraulic fluid from the transmission pump is selectively provided to the clutch pack to actuate the clutch pack between an open configuration and a fully closed configuration,
wherein the first and second side gears: (i) rotate independently in the open configuration such that the first and second drive wheels can rotate at different speeds, and (ii) rotate together in the fully closed configuration such that the first and second drive wheels rotate at a same speed.

12. The vehicle driveline of claim 11, wherein:
the clutch pack includes a plurality of annular plates interleaved with a plurality of annular friction disks, the plurality of annular plates being coupled for rotation with one of the differential case and the differential gear assembly and the plurality of annular friction disks being coupled for rotation with the other one of the differential case and the differential gear assembly,
the open configuration corresponds to the plurality of annular plates and the plurality of annular friction disks being configured to rotate independently in a substantially non-contacting relationship, and
the fully closed configuration corresponds to the plurality of annular plates and the plurality of annular friction disks being configured to rotate together in a contacting relationship.

13. The vehicle driveline of claim 12, wherein the clutch actuator is configured to selectively actuate the clutch pack between the open configuration, the fully closed configuration and at least one intermediate partially closed configuration, wherein the at least one intermediate partially closed configuration corresponds to the plurality of annular plates and the plurality of annular friction disks being in a contacting relationship in order to reduce relative rotation between the plurality of annular plates and the plurality of annular friction disks such that the first and second side gears do not rotate completely independently.

14. The vehicle driveline of claim 11, further comprising a hydraulic fluid valve that provides pressurized hydraulic fluid from the transmission pump to the clutch pack, wherein the clutch actuator includes a piston that interacts with the clutch pack to selectively actuate the clutch pack between the open and fully closed configuration, the piston being in fluid communication with the hydraulic fluid valve.

15. The vehicle driveline of claim 14, wherein the clutch actuator further includes the hydraulic fluid valve.

16. The vehicle driveline of claim 15, wherein the hydraulic fluid valve is a spool valve.

17. The vehicle driveline of claim 11, wherein the limited slip differential assembly further includes:
   a pressure sensor for sensing a pressure of the pressurized hydraulic fluid provided to the clutch pack; and
   a controller in communication with the pressure sensor and configured to provide a control signal to the hydraulic fluid valve to adjust the pressure.

18. The vehicle driveline of claim 17, wherein the controller is a proportional-integral-derivative controller.

19. The vehicle driveline of claim 11, wherein the first and second drive wheels of the vehicle are front wheels.

20. The vehicle driveline of claim 18 wherein the controller further comprises a proportional-derivative controller, an integral controller and a feed forward circuit, wherein an output of the integral controller is provided to a first saturation limiting circuit, wherein respective outputs of the proportional-derivative controller and the integral controller are summed at a second saturation limiting circuit, wherein an output of the second saturation limiting circuit is summed with an output of the feed forward circuit and provided to a third saturation limiting circuit, an output of the third saturation limiting circuit controlling the hydraulic fluid valve, wherein each of the first, second and third saturation limiting circuits ensure that a respective output signal does not exceed a saturation limit of the hydraulic fluid valve.

* * * * *